US012531078B2

(12) United States Patent
Kandade Rajan

(10) Patent No.: US 12,531,078 B2
(45) Date of Patent: Jan. 20, 2026

(54) NOISE SUPPRESSION FOR SPEECH ENHANCEMENT

(71) Applicant: Harman Becker Automotive Systems GmbH, Karlsbad (DE)

(72) Inventor: Vasudev Kandade Rajan, Straubing (DE)

(73) Assignee: Harman Becker Automotive Systems GmbH, Karlsbad (DE)

( * ) Notice: Subject to any disclaimer, the term of this patent is extended or adjusted under 35 U.S.C. 154(b) by 421 days.

(21) Appl. No.: 17/911,224

(22) PCT Filed: Mar. 30, 2020

(86) PCT No.: PCT/EP2020/058944
§ 371 (c)(1),
(2) Date: Sep. 13, 2022

(87) PCT Pub. No.: WO2021/197566
PCT Pub. Date: Oct. 7, 2021

(65) Prior Publication Data

US 2023/0095174 A1 Mar. 30, 2023

(51) Int. Cl.
*G10L 21/0208* (2013.01)
*G10L 25/06* (2013.01)
(Continued)

(52) U.S. Cl.
CPC .......... *G10L 21/0208* (2013.01); *G10L 25/06* (2013.01); *G10L 25/51* (2013.01); *G10L 25/78* (2013.01)

(58) Field of Classification Search
CPC ..... G10L 21/0208; G10L 25/06; G10L 25/51; G10L 25/78
See application file for complete search history.

(56) References Cited

U.S. PATENT DOCUMENTS

2002/0029141 A1* 3/2002 Cox ...................... G10L 19/265 704/E19.046
2007/0198251 A1* 8/2007 Jaber ...................... G10L 25/78 704/E11.003

(Continued)

FOREIGN PATENT DOCUMENTS

WO 2017136018 A1 8/2017

OTHER PUBLICATIONS

Sakhnov et al. ("Approach for Energy-Based Voice Detector with Adaptive Scaling Factor"), 2009 (Year: 2009).*

(Continued)

*Primary Examiner* — Hai Phan
*Assistant Examiner* — Alvin Iskender
(74) *Attorney, Agent, or Firm* — BROOKS KUSHMAN P.C.

(57) ABSTRACT

A noise suppression method includes transforming a time-domain input signal into an input spectrum that is the spectrum of the input signal, the input signal comprising speech components and noise components, and the input spectrum comprising a speech spectrum that is the spectrum of the speech components and a noise spectrum that is the spectrum of the noise components, smoothing magnitudes of the input spectrum to provide a smoothed-magnitude input spectrum, and estimating basic suppression filter coefficients from the input spectrum and the smoothed input spectrum. The method further includes determining noise suppression filter coefficients from the estimated basic suppression filter coefficients and a spectral correlation factor, the spectral correlation factor indicating whether speech is present in the input signal or not, filtering the input spectrum based on the noise suppression filter coefficients to generate an output spectrum; and transforming the output spectrum into a time-domain output signal.

19 Claims, 4 Drawing Sheets

(51) Int. Cl.
*G10L 25/51* (2013.01)
*G10L 25/78* (2013.01)

(56) References Cited

U.S. PATENT DOCUMENTS

| | | | | |
|---|---|---|---|---|
| 2012/0136655 | A1* | 5/2012 | Yamabe | G10L 25/90 704/207 |
| 2014/0309992 | A1* | 10/2014 | Carney | G10L 21/02 704/209 |
| 2016/0035370 | A1* | 2/2016 | Krini | G10L 21/02 704/209 |
| 2018/0137880 | A1* | 5/2018 | Wenndt | H04L 63/162 |
| 2019/0206420 | A1* | 7/2019 | Kandade Rajan | G10L 21/0264 |
| 2019/0305845 | A1* | 10/2019 | Cyr | H04B 10/07955 |

OTHER PUBLICATIONS

Yoo et al. ("Formant-Based Robust Voice Activity Detection"), 2015 (Year: 2015).*

International Search Report dated Dec. 16, 2020 for PCT Appn. No. PCT/EP2020/058944 filed Mar. 30, 2020, 12 pgs.

Graf, S. et al., "Features for voice activity detection: a comparative analysis", Eurasip Journal on Advances in Signal Processing, Nov. 11, 2015, 16 pgs., vol. 15, No. 10.

Allen, J. B., "Short Term Spectral Analysis, Synthesis, and Modification by Discrete Fourier Transform", IEEE Transactions on Acoustics, Speech, and Signal Processing, Jun. 1977, 4 pgs., vol. ASSP-25, No. 3.

Baasch, C., et al., "Low-Complexity Noise Power Spectral Density Estimation for Harsh Automobile Environments", Sep. 8-11, 2014, 5 pgs.

Goodwin, M. M., "The STFT, Sinusoidal Models, and Speech Modification", Springer Handbook of Speech Processing, 2008, 30 pgs.

Hansler, E., et al., "Acoustic Echo and Noise Control: A Practical Approach", 2004, 475 pgs., Wiley.

Rabiner, L. R., et al., "Digital Processing of Speech Signals", 1978, 527 pgs., Prentice-Hall, Inc., Englewood Cliffs, New Jersey.

Wiener, N., "Extrapolation, Interpolation and Smoothing of Stationary Time Series", 1949, 170 pgs., MIT Press.

* cited by examiner

NOISE SUPPRESSION FOR SPEECH ENHANCEMENT

CROSS-REFERENCE TO RELATED APPLICATION

This application is the U.S. national phase of PCT Application No. PCT/EP2020/058944 filed on Mar. 30, 2020, the disclosure of which is incorporated in its entirety by reference herein.

BACKGROUND

1. Technical Field

The disclosure relates to a system and method (both generally referred to as a "structure") for noise reduction applicable in speech enhancement.

2. Related Art

Speech contains different articulations such as vowels, fricatives, nasals, etc. These articulations and other speech properties, such as short-term power, can be exploited to assist speech enhancement in systems such as noise reduction systems. A critical noise case is, for example, the reduction of the so called "babble noise". Babble noise is defined as a constant chatter in the background of a conversation. This constant chatter is extremely hard to suppress because it is speech-like and traditional voice activity detectors (VADs) would fail. The use of microphones of different types aggravates this drawback, particularly in the context of far-field microphone applications, because the speaker can potentially talk from any distance to the device (from other rooms of a house, large office spaces, etc.). There is a desire to improve the behavior of voice activity detectors in connection with babble noise.

SUMMARY

A noise suppression method includes transforming a time-domain input signal into an input spectrum that is the spectrum of the input signal, the input signal comprising speech components and noise components, and the input spectrum comprising a speech spectrum that is the spectrum of the speech components and a noise spectrum that is the spectrum of the noise components, smoothing magnitudes of the input spectrum to provide a smoothed-magnitude input spectrum, and estimating basic suppression filter coefficients from the input spectrum and the smoothed input spectrum. The method further includes determining noise suppression filter coefficients from the estimated basic suppression filter coefficients and a spectral correlation factor, the spectral correlation factor indicating whether speech is present in the input signal or not, filtering the input spectrum based on the noise suppression filter coefficients to generate an output spectrum; and transforming the output spectrum into a time-domain output signal. The spectral correlation factor is determined from a scaling factor and the smoothed input spectrum, the scaling factor being determined iteratively starting from a start correlation factor.

An example noise suppression structure includes a processor and a memory, the memory storing instructions of a program and the processor configured to execute the instructions of the program, carrying out the above-described method.

An example computer program product includes instructions which, when the program is executed by a computer, cause the computer to carry out the above-described method.

Other systems, methods, features and advantages will be, or will become, apparent to one with skill in the art upon examination of the following detailed description and appended figures. It is intended that all such additional systems, methods, features and advantages be included within this description, be within the scope of the invention, and be protected by the following claims.

BRIEF DESCRIPTION OF THE DRAWINGS

The system may be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION

Figure 1:
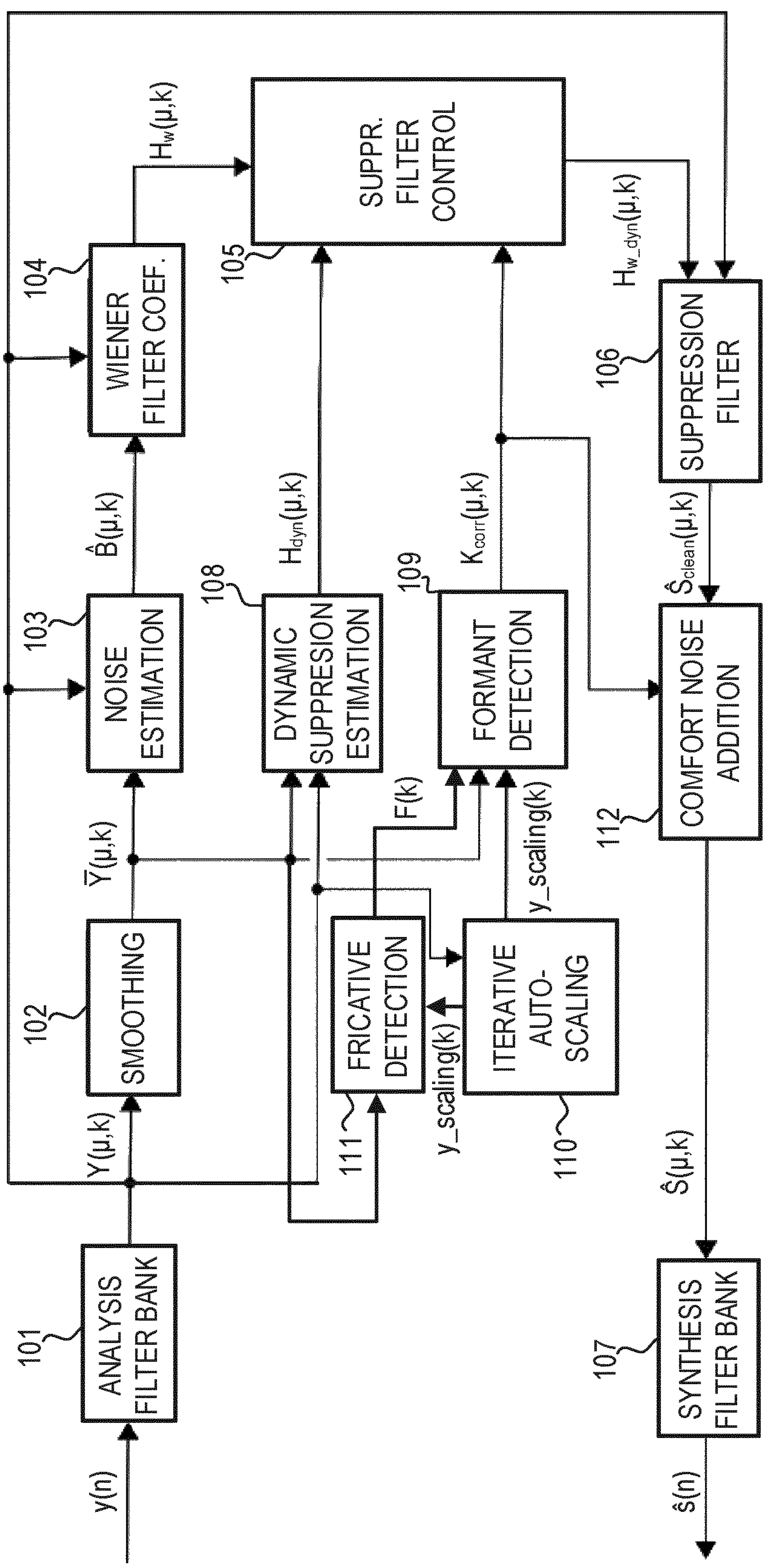
FIG. 1 is a schematic diagram illustrating an exemplary structure for reducing noise using autoscaling.

A voice activity detector outputs a detection signal that, when binary, assumes, for example, 1 or 0 indicating the presence or absence of speech, respectively. In some cases, the output signal of the voice activity detector may be between and including 0 and 1, which may indicate a certain measure or a certain probability for the presence of the speech in the signal under investigation. The detection signal may be used in different parts of speech enhancement systems such as echo cancellers, beamformers, noise estimators, noise reduction systems, etc.

One way to detect a formant in speech is to evaluate the presence of a harmonic structure in a speech segment. The harmonic structure has a fundamental frequency, referred to as the first formant, and its harmonics. Due to the anatomical structure of the human speech generation system, harmonics are inevitably present in most human speech articulations. If the formants of a speech are correctly detected, this can identify a majority of the speech present in recorded signals. Although this does not cover cases such as fricatives, when intelligently used, this can replace traditional voice activity detectors or even work in tandem with traditional voice activity detectors.

Expanding on the above-described approach further, a formant may be detected in a speech by searching for peaks which are periodically present in the spectral content of the speech segment. Although this can be implemented easily, it is not computationally attractive to perform search operations on every spectral frame. Another way to detect formants in a signal is to perform a normalized spectral correlation Corr given by $$Corr = \frac{\sum_{\mu=0}^{N_{Sbb}} \bar{Y}(\mu, k) \cdot \bar{Y}(\mu, k)}{N_{Sbb} + 1}, \qquad (1)$$

wherein $\bar{Y}(\mu,k)$ is the smoothed magnitude noisy input spectrum, μ is a (subband) frequency bin and k represents a time frame. Herein "normalize" entails that the spectral correlation is divided by the total number of subbands, but does not entail that the input spectrum is normalized in a common sense. With a detection signal generated according to Equation (1) along with a threshold parameter $K_{thr}$ it is possible to classify signal segments as formant speech segments or non-formant speech segments.

To make the detection more robust against background noise, the first modification to the primary detection method outlined above is to band-limit the normalized correlation with a lower frequency ($\mu_{min}$) and an upper frequency ($\mu_{max}$) applied in the subband domain. The lower frequency may be set, e.g., to around 100 Hz and the upper frequency may be set, e.g., to around 3000 Hz. This limitation allows: (1) early detection of formants in the beginning of syllables, (2) a higher spectral signal-to-noise ratio (SNR) or signal-to-noise ratio per band in the chosen frequency range, which increases the detection chances, and (3) robustness in a wide range of noisy environments. The band-limited spectrally-normalized spectral correlation NormSpecCorr may be computed according to $$NormSpecCorr = \frac{\sum_{\mu=\mu_{min}}^{\mu_{max}} \bar{Y}(\mu, k)\cdot \bar{Y}(\mu, k)}{(\mu_{max} - \mu_{max}) + 1}. \quad (2)$$

As mentioned before, the input spectrum is not normalized. One reason for this is that, like speech signals, noise signals may also have a harmonic structure. When the noisy input spectrum is normalized in practical situations, it is difficult to adjust the detection threshold parameter $K_{thr}$ for accurate detection of speech formants as compared to harmonics which could be present in the background noise. Further, due to the known Lombard effect, a speaker usually makes an intrinsic effort to speak louder than the background noise. Keeping these factors in mind, instead of directly using the primary detection approach as described in Equation (1) or the band-limited detection as described in Equation (2), a so-called scaling factor y_scaling(k) is introduced to the detection signal which results in $$\bar{Y}_{scaled}(\mu, k) = \text{y\_scaling}(k)\cdot \bar{Y}_{scaled}(\mu, k) \text{ and} \quad (3)$$

$$K_{corr}(k) = \frac{\sum_{\mu=\mu_{min}}^{\mu_{max}} \bar{Y}(\mu, k)\cdot \bar{Y}(\mu, k)}{(\mu_{max} - \mu_{max}) + 1}. \quad (4)$$

The scaling factor y_scaling(k) is multiplied with the smoothed magnitudes of the input spectrum, which results in a scaled input spectrum $\bar{Y}_{scaled}(\mu,k)$. Before computing the effect the scaling factor y_scaling(k) is to use to detect speech formants, the estimate will be more robust if the scaling factor (?) is computed when there is speech-like activity in the input signals. A level is computed as a long-term average of the instantaneous level estimate $Y_{inst}(k)$ measured for a fixed time-window of L frames, wherein $T_{lev-SNR}$ represents the threshold for activity detection and $\hat{B}(\mu, k)$ represents the background noise estimate, i.e., the estimated noise component included in the input signal. The instantaneous level can be estimated by $$Y_{inst}(k) = \begin{cases} Y_{inst}(k) + \bar{Y}(\mu, k),\ k_\mu = 1, \text{ if } \bar{Y}(\mu, k) > \hat{B}(\mu, k)\cdot T_{lev-SNR} \\ Y_{inst}(k),\ k_\mu = 0, \text{ else} \end{cases}. \quad (5)$$

Equation (5) is evaluated for every subband μ, at the end of which the total number of subbands that satisfy the condition of speech-like activity is given by the summing of the bin counter k·μ. This counter and the instantaneous level are reset to 0 before the level is estimated. The normalized instantaneous level estimate $\bar{Y}_{inst}(k)$ is then obtained by $$\bar{Y}_{inst}(k) = \frac{Y_{inst}(k)}{\sum_{\mu=0}^{N_{Sbb}} k\mu}. \quad (6)$$

The long-term average of the level can be obtained by time-window averaging over L frames in combination with infinite impulse response (IIR) filter based smoothing of the time-window average. In place of a two stage filtering, a smoothing filter that is based on an IIR filter can be used, which would be longer with more tuning coefficients. However, the two-stage filtering or smoothing can achieve the same smoothing results with reduced computational complexity. In the two-stage filter, the time-window average is obtained by simply storing L previous values of the instantaneous estimate and computing the average $Y_{time-window}(k)$ according to $$Y_{time-window}(k) = \frac{\sum_{i=0}^{L} \bar{Y}_{inst}(k-i)}{L}. \quad (7)$$

Given that the scaling value does not need to react to the dynamics of the varying level estimates, further an IIR based smoothing is applied to the time-window estimate given by $$\bar{Y}_{lev}(k) = \propto_{lev} Y_{time-window}(k) + (1-\propto_{lev}) Y_{time-window}(k), \quad (8)$$

where $\bar{Y}_{lev}(k)$ is the final level estimate of the noisy input spectrum.

The formants in speech signals can be used as speech presence detector which, when supported by other voice activity detector algorithms, can be utilized in noise reduction systems. The approach described above allows detecting formants in noisy speech frames. The detector outputs a soft-decision. Although the primary approach for detection is very simple, it may be enhanced with three robustness features: (1) band-limited formant detection, (2) scaling through speech level estimation of varying speech levels of the input signal, and (3) reference signal masked scaling (or level estimation) for protection against echolike scenarios. In a noise processing structure presented below, the output of the interframe formant detection procedure is a detection signal $K_{corr}(k)$. The approach described above aims to overcome this drawback in some cases, but because of the different kinds of microphones used, a so called "optimal scaling" is required to exactly determine the onset/offset of such background noise scenarios. The drawback is exacerbated in farfield microphone applications as the speaker can potentially talk from any distance to the device (like from other rooms in a house, large office spaces, etc.). To overcome this drawback, an automatically computed "scaling factor" is utilized.

FIG. 1 illustrates an example system for reducing noise, also referred to as noise reduction (NR) system, in which the noise to be reduced is included in a noisy speech signal y(n), wherein n designates discrete-time domain samples. In the system shown in FIG. 1, a time-to-frequency domain transformer, e.g., an analysis filter bank 101, transforms the time-domain input signal y(n) into a spectrum of the input signal y(n), an input spectrum Y(μ,k), wherein (μ,k) designates a μth subband for a time-frame k. The input signal y(n) is a noisy speech signal, i.e., it includes speech components and noise components. Accordingly, the input spectrum Y(μ,k) includes a speech spectrum that is the spectrum of the speech components and a noise spectrum that is the spectrum of the noise components. A smoothing filter 102 operatively coupled to the analysis filter bank 101 smoothes magnitudes of the input spectrum Y(μ,k) to provide a smoothed-magnitude input spectrum $\overline{Y}$Y(μ,k). A noise estimator 103 operatively coupled to the smoothing filter 102 and the analysis filter bank 101 estimates, based on the smoothed-magnitude input spectrum $\overline{Y}$(μ,k) and the input spectrum Y(μ,k), magnitudes of the noise spectrum to provide an estimated noise spectrum $\hat{B}$ (μ,k). A Wiener filter coefficient estimator 104 operatively coupled to the noise estimator 103 and the analysis filter bank 101 provides estimated Wiener filter coefficients $H_w(\mu,k)$ based on the estimated noise spectrum B(μ,k) and the input spectrum Y(μ,k).

A suppression filter controller 105 operatively coupled to the Wiener filter coefficient estimator 104 estimates (dynamic) suppression filter coefficients $H_{dyn}(\mu,k)$, based on the estimated Wiener filter coefficients $H_w(\mu,k)$ and optionally at least one of a correlation factor $K_{corr}(\mu,k)$ for formant based detection and estimated noise suppression filter coefficients $H_{w\_dyn}(\mu,k)$. A noise suppression filter 106, which is operatively coupled to the suppression filter controller 105 and the analysis filter bank 101, filters the input spectrum Y(μ,k) according to the estimated (dynamic) suppression filter coefficients $H_{dyn}(\mu,k)$ to provide a clean estimated speech spectrum $\hat{S}_{clean}(\mu,k)$. An output (frequency-to-time) domain transformer, e.g., a synthesis filter bank 107, which is operatively coupled to the noise suppression filter 106, transforms the clean estimated speech spectrum $\hat{S}_{clean}(\mu,k)$ or a corresponding spectrum such as a spectrum $\hat{S}(\mu,k)$ into a time-domain output signal ŝ(n) representative of the speech components of the input signal y(n).

The estimated noise suppression filter coefficients $H_{w\_dyn}(\mu,k)$ may be derived from the input spectrum $\overline{Y}$(μ, k) and the smoothed-magnitude input spectrum $\overline{Y}$(μ, k) by way of dynamic suppression estimator 108 which is operatively coupled to the analysis filter bank 101 and the smoothing filter 102. The correlation factor $K_{corr}(\mu,k)$ may be derived by way of an interframe formant detector 109 which receives the smoothed-magnitude input spectrum $\overline{Y}$(μ, k) from the smoothing filter 102 and a scaling factor $y_{scaling}(k)$ for dynamic noise input scaling from an iterative autoscaling computation 110 which receives the input spectrum Y(μ, k) from the analysis filter bank 101. The interframe formant detector 109 further receives a fricative indication signal F(k) for indicating the presence of fricatives in the input signal y(n) from an interframe fricative detector 111. The interframe fricative detector 111 receives the smoothed-magnitude input spectrum $\overline{Y}$(μ, k) from the smoothing filter 102 and the scaling factor $y_{scaling}(k)$ for dynamic noise input scaling from the iterative autoscaling computation 110. The correlation factor $K_{corr}(\mu,k)$ may further be used to control an optional comfort noise adder 112 which may be connected between the noise suppression filter 106 and the synthesis filter bank 107. The comfort noise adder 112 adds comfort noise with a predetermined structure and amplitude to the clean estimated speech spectrum $\hat{S}_{clean}(\mu,k)$ to provide the spectrum $\hat{S}(\mu,k)$ that is input into the synthesis filter bank 107.

The input signal y(n) and the reference signal x(n) may be transformed from the time domain to the frequency (spectral) domain, i.e., into the input spectrum Y(μ,k) by the analysis filter bank 101 employing an appropriate domain transform algorithm such as, e.g., a short term Fourier transform (STFT). STFT may also be used in the synthesis filter bank 107 to transform the clean estimated speech spectrum $\hat{S}_{clean}(\mu,k)$ or the spectrum $\hat{S}(\mu,k)$ into the time-domain signal output signal ŝ(n). For example, the analysis may be performed in frames by a sliding low-pass filter window and a discrete Fourier transformation (DFT), a frame being defined by the Nyquist period of the bandlimited window. The synthesis may be similar to an overlap add process, and may employ an inverse DFT and a vector add each frame. Spectral modifications may be included if zeros are appended to the window function prior to the analysis, the number of zeros being equal to the time characteristic length of the modification.

In the following examples, a frame k of the noisy input spectrum STFT(y(n)) forms the basis for further processing. By way of magnitude smoothing, the instantaneous fluctuations are removed but the long-term dynamicity of the noise is retained according to $\overline{Y}$(μ, k)=Smooth(Y(μ,k)). The smoothed magnitude of the input spectrum $\overline{Y}$(μ, k) may be used to estimate the magnitude of the (background) noise spectrum. Such an estimation may be performed by way of a processing scheme that is able to deal with the harsh noise environment present, e.g., in automobiles, and to meet the desire to keep the complexity low for real-time implementations. The scheme may be based on a multiplicative estimator in which multiple increment and decrement time-constants are utilized. The time constants may be chosen based on noise-only and speech-like situations. Further, by observing the long-term “trend” of the noisy input spectrum, suitable time-constants can be chosen, which reduces the tracking delay significantly. The trend factor can be measured while taking into account the dynamics of speech.

For example, the noisy speech signal in the discrete-time domain may be described as y(n)=s(n)+b(n) where n is again the discrete time index, y(n) is the (noisy speech) signal recorded by a microphone, s(n) is the clean speech signal and b(n) is the noise component. The processing of the signals is performed in the subband domain. An STFT based analysis-synthesis filterbank is used to transform the signal into its subbands and back to the time-domain. The output of the analysis filterbank is the short-term spectrum of the input signal Y(μ,k) where, again, μ is the subband index and k is the frame index. The estimated background noise B(μ,k) is used by a noise suppression filter such as the Wiener filter to obtain an estimate of the clean speech.

Noise present in the input spectrum can be estimated by accurately tracking the segments of the spectrum in which speech is absent. The behavior of this spectrum is dependent on the environment in which the microphone is placed. In an automobile environment, for example, there are many factors that contribute to the noise spectrum being/becoming non-stationary. For such environments, the noise spectrum can be described as non-flat with a low-pass characteristic dominating below 500 Hz. Apart from this low-pass characteristic, changes in speed, the opening and closing of windows, passing cars, etc. may also cause the noise floor to vary with time. A close look at one frequency bin of the noise spectrum reveals the following properties: (a) Instantaneous power can vary from the mean power to a large extent even under steady conditions, and (b) a steady increase or a steady decrease of power is observed in certain situations (e.g., during acceleration). A simple estimator, which can be used to track these magnitude changes for each frequency bin, is described in Equation (10)

$$\hat{B}(\mu,k)=\begin{cases}\hat{B}(\mu,k-1)\Delta_{inc}, & \text{if } \bar{Y}(\mu,k)>\hat{B}(\mu,k-1),\\ \hat{B}(\mu,k-1)\Delta_{dec}, & \text{else.}\end{cases} \tag{10}$$

This estimator follows a smoothed input $\bar{Y}(\mu, k)$ based on the previous noise estimate. The speed at which it tracks the noise floor is controlled by an increment constant $\Delta_{inc}$ and a decrement constant $\Delta_{dec}$. Such an estimator allows for low computational complexity and can be made to work with careful parameterization of increment and decrement constants combined with a highly smoothed input. According to the observations presented above about noise behavior, such an estimator may struggle with low time-constants that will lag in tracking the noise power, and high time-constants that will estimate speech as noise.

Starting from this simple estimator, a noise estimation scheme may be employed that allows keeping the computational complexity low and offering fast, accurate tracking. The estimator is to choose the "right" multiplicative constant for a given specific situation. Such a situation can be a speech passage, a consistent background noise, increasing background noise, decreasing background noise, etc. A value referred to as "trend" is computed which indicates whether the long-term direction of the input signal is going up or down. The increment and decrement time-constants along with the trend are applied together in Equation (11).

Tracking of the noise estimator is dependent on the smoothed input spectrum $\bar{Y}(\mu, k)$. The input spectrum $Y(\mu,k)$ is smoothed using a first order infinite impulse response (IIR) filter $$\bar{Y}(\mu,k)=\gamma_{smth}|Y(\mu,k)|+(1-\gamma_{smth})\bar{Y}(\mu,k-1), \tag{11}$$

in which $\gamma_{smth}$ is a smoothing constant. The smoothing constant $\gamma_{smth}$ is chosen in such a way that it retains fine variations of the input spectrum $Y(\mu,k)$ as well as eliminating the high variation of the instantaneous spectrum. Optionally, additional frequency-domain smoothing can be applied.

One of the difficulties with noise estimators in non-stationary environments is differentiating between a speech part of the spectrum and a change in the spectral floor. This can be at least partially overcome by measuring the duration of a power increase. If the increase is due to a speech source, the power will drop after the utterance of a syllable, whereas, if the power continues to stay high for a longer duration, it is an indication of increased background noise. It is these dynamics of the input spectrum that the trend factor measures in the processing scheme. By observing the direction of the trend—going up or down—the spectral floor changes can be tracked while avoiding the tracking of the speech-like parts of the spectrum. The decision as to the current state of the frame is made by comparison to determine whether the estimated noise of the previous frame is smaller than the smoothed input spectrum of the current frame, by which a set of values are obtained. A positive value indicates that the direction is going up, and a negative value indicates that the direction is going down as, for example, $$A_{curr}(\mu,k)=\begin{cases}1, & \text{if } \bar{Y}(\mu,k)>\hat{B}(\mu,k-1),\\ -4, & \text{else,}\end{cases} \tag{12}$$

where $\hat{B}(\mu, k-1)$ represents the estimated noise of the previous frame. The values 1 and −4 are exemplary and any other appropriate value can be applied. The trend can be smoothed along both the time and the frequency axis. A zero-phase forward-backward filter may be used to smooth along the frequency axis. Smoothing along the frequency axis ensures that isolated peaks caused by non-speech-like activities are suppressed. Smoothing is applied according to $$\bar{A}_{trnd}(\mu,k)=\gamma_{trnd-fq}A_{curr}(\mu,k)+(1-\gamma_{trnd-fq})\bar{A}_{trnd}(\mu-1,k), \tag{13}$$

for $\mu=1, \ldots, N_{Sbb}$ and similarly backward smoothing is applied. The time-smoothed trend factor $\bar{\bar{A}}_{trnd}(\mu, k)$ again is given by an IIR filter $$\bar{\bar{A}}_{trnd}(\mu,k)=\gamma_{trnd-tm}\hat{A}_{trnd}(\mu,k)+(1-\gamma_{trnd-tm})\bar{\bar{A}}_{trnd}(\mu,k-1), \tag{14}$$

where $\gamma_{trnd-tm}$ is a smoothing constant. The behavior of the double-smoothed trend factor $\bar{\bar{A}}_{trnd}(\mu, k)$ can be summarized as follows: The trend factor is a long-term indicator of the power level of the input spectrum. During speech parts, the trend factor temporarily goes up but comes down quickly. When the true background noise increases, the trend goes up and stays there until the noise estimate catches up. A similar behavior may occur for a decreasing background noise power. This trend measure is used to further "push" the noise estimate in the desired direction. The trend is compared to an upward threshold and a downward threshold. When either of these thresholds is reached, the respective time-constant to be later used is chosen as shown in Equation (15)

$$\Delta_{trend}(\mu,k)=\begin{cases}\Delta_{trend-up}, & \text{if } \bar{\bar{A}}_{trnd}(\mu,k)>T_{trnd-up},\\ \Delta_{trend-down}, & \text{else if } \bar{\bar{A}}_{trnd}(\mu,k)<T_{trnd-down}\\ 1, & \text{else.}\end{cases} \tag{15}$$

Tracking of the noise estimation is performed for two cases. One such case is when the smoothed input is greater than the estimated noise, and the second is when it is smaller. The input spectrum can be greater than the estimated noise due to three reasons: First, when there is speech activity, second, when the previous noise estimate has dipped too low and must rise, and third when there is a continuous increase in the true background noise. The first case is addressed by checking whether the level of the input spectrum $Y(\mu,k)$ is greater than a certain signal-to-noise ratio (SNR) threshold $T_{snr}$, in which case the chosen incremental constant $\Delta_{speech}$ has to be very slow because speech should not be tracked. For the second case the incremental constant is set to $\Delta_{noise}$ which means that this is a case of normal rise and fall during tracking. In the case of a continuous increase in the true background noise, the estimate must catch up with this increase as fast as possible. For this a counter providing counts $k_{cnt}(\mu,k)$ is utilized. The counter counts the duration over which the input spectrum has stayed above the estimated noise. If the count reaches a threshold $K_{inc-max}$, a fast incremental constant $\Delta_{inc-fast}$ may be chosen. The counter is incremented by 1 every time the input spectrum $Y(\mu,k)$ becomes greater than the estimated noise spectrum $\hat{B}(\mu, k-1)$ and reset to 0 otherwise. Equation (16) captures these conditions $$\Delta_{inc}(\mu,k)=\begin{cases}\Delta_{inc-fast}, & \text{if } k_{cnt}(\mu,k)>K_{inc-max},\\ \Delta_{speech}, & \text{else if } \bar{Y}(\mu,k)>\hat{B}(\mu,k-1)T_{snr},\\ \Delta_{noise}, & \text{else.}\end{cases} \tag{16}$$

The choice of a decrement constant $\Delta_{dec}$ does not have to be as explicit as in the case of the increment constant. This is because there is less ambiguity when the input spectrum $Y(\mu,k)$ is narrower than the estimated noise spectrum $\hat{B}(\mu, k-1)$. Here the noise estimator chooses the decremental constant $\Delta_{dec}$ by default. For a subband only one of the above two stated conditions is chosen. From either of the two conditions a final multiplicative constant is determined $$\Delta_{final}(\mu, k) = \begin{cases} \Delta_{inc}(\mu, k), & \text{if } \overline{Y}(\mu, k) > \hat{B}(\mu, k-1). \\ \Delta_{dec}, & \text{else.} \end{cases} \quad (17)$$

The input spectrum includes only background noise when no speech-like activity is present. At such times, the best estimate is achieved by setting the noise estimate equal to the input spectrum. When the estimated noise is lower than the input spectrum, the noise estimate and the input spectrum are combined with a certain weight. The weights are computed according to Equation (18). A pre-estimate $\hat{B}_{pre}(\mu, k)$ is obtained to compute the weights. The pre-estimate $\hat{B}_{pre}(\mu, k)$ is used in combination with the input spectrum. It is obtained by multiplying the input spectrum with the multiplicative constant $\Delta_{final}(\mu, k)$ and the trend constant $\Delta_{Trend}(\mu,k)$ according to $$\hat{B}_{pre}(\mu,k)=\Delta_{final}(\mu,k)\Delta_{Trend}(\mu,k)\hat{B}(\mu,k-1). \quad (18)$$

A weighting factor $W_{\hat{B}}(\mu, k)$ for combining the input spectrum $Y(\mu,k)$ and the pre-estimate $\hat{B}_{pre}(\mu, k)$ is given by $$W_{\hat{B}}(\mu, k) = \min\left\{1, \left(\frac{\hat{B}_{pre}(\mu, k)}{\overline{Y}(\mu, k)}\right)^2\right\} \quad (19)$$

The final noise estimate is determined by applying this weighting factor $$\hat{B}(\mu,k)=W_{\hat{B}}(\mu,k)\overline{Y}(\mu,k)\overline{Y}(\mu,k)+(1-W_{\hat{B}}(\mu,k))\hat{B}_{pre}(\mu,k). \quad (20)$$

During the first few frames of the noise estimation process, the input spectrum itself is directly chosen as the noise estimate for faster convergence.

The estimated background noise $\hat{B}(\mu, k)$ and the magnitude of the input spectrum $|Y(\mu,k)|$ are combined to compute basic noise suppression filter coefficients, $H_w(\mu,k)$, also referred to as the Wiener filter coefficients by, $$H_w(\mu, k) = \max\left(1, \frac{\hat{B}_{pre}(\mu, k)}{\overline{Y}(\mu, k)}\right) \quad (21)$$

The Wiener filter coefficients $H_w(\mu,k)$ are applied to the complex spectra of the input spectrum $Y(\mu,k)$ to obtain an estimate of the clean speech spectrum $\hat{S}(\mu,k)$, which is $$\hat{S}(\mu,k)=H_w(\mu,k)\cdot Y(\mu,k). \quad (22)$$

The estimated clean speech spectrum $\hat{S}(\mu,k)$ is transformed into the discrete-time domain by the synthesis filter bank to obtain the estimated clean speech signal $\hat{s}(n)=\text{ISTFT}(\hat{S}(\mu, k))$, where ISTFT is the application of the synthesis filter bank, e.g., an inverse short term Fourier transform.

In order to control highly non-stationary (i.e., dynamic) noise, the noisy input signal (i.e., the input spectrum), is suppressed in a time-frequency controlled manner, and the applied suppression is not constant. The amount of suppression to be applied is determined by the "dynamicity" of the noise in the noisy input signal. The output of the dynamic suppression scheme is a set of filter coefficients $H_{dyn}(\mu,k)$ which determine the amount of suppression to be applied to "dynamic noise parts" given by $$H_{dyn}(\mu,k)=\text{DynSupp}(Y(\mu,k),\overline{Y}(\mu,k)). \quad (23)$$

The output of the dynamic suppression estimator 108 is denoted as dynamic suppression filter coefficients $H_{dyn}(\mu,k)$. The dynamic suppression estimator 108 may, e.g., compare the input spectrum $Y(\mu,k)$ and the smoothed input spectrum $\overline{Y}(\mu,k)$. In order to detect speech formants and speech fricative in the input signal y(n), the scaling factor $y_{\_scaling}(k)$ is employed. The generation of the scaling factor $y_{\_scaling}(k)$ will be described in detail further below.

Interframe formant detection is performed in the interframe formant detector 109 which detects formants present in the noisy input speech signal y(n). This detection outputs a signal which is a time-varying signal or a time-frequency varying signal. The output of the interframe formant detector 108 is a spectral correlation factor $K_{corr}(\mu,k)$ given by $$K_{corr}(\mu,k)=\text{FormantDetection}(y_{scaling}(k),H_{dyn}(\mu,k)). \quad (24)$$

The spectral correlation factor $K_{corr}(\mu,k)$ provided by the interframe formant detector 108 is a signal which may be a value between 0 and 1, indicating whether formants are present or not. By choosing an adequate threshold, this signal allows determining which parts of the time-frequency noisy input spectrum are to be suppressed.

Fricative detection is performed in the fricative detector which detects white-noise like sounds (fricatives) present in the noisy input speech signal y(n). The output F(k) of the fricative detector is a binary signal indicating if the given speech frame is a fricative frame or not. This binary output signal is input into the Interframe formant detector, which combines the binary formant detection and collectively influence the correlation factor $K_{corr}(\mu,k)$. A multiplicity of methods for detecting fricatives is known in the art.

Noise suppression filter coefficients are determined in the suppression filter controller 105 based on the Wiener filter coefficients, dynamic suppression coefficients, and the formant detection signal and supplied as final noise suppression filter coefficients to the noise suppression filter 106. The three components mentioned above are combined to obtain the final suppression filter coefficients Hw_dyn(μ,k) which are given by $$H_{w\_dyn}(\mu,k)=\text{FinalSuppCoeffs}(K_{corr}(\mu,k),H_{dyn}(\mu,k),H_w(\mu,k)). \quad (25)$$

The example noise reduction structure described in connection with FIG. 1 can be generalized as follows: The discrete noisy signal y(n) is input to the analysis filterbank, which transforms the discrete time-domain signal into a discrete frequency-domain signal, i.e., a spectrum thereof, using for example short-term Fourier transform (STFT). The (e.g., complex) spectrum is smoothed and the smoothed spectrum is used to estimate the background noise. The estimated noise together with the complex spectrum provides a basis for computing a basic noise suppression filter, e.g., a Wiener filter, and the smoothed spectrum and the complex spectrum provide a basis for computing the so-called dynamic suppression filter. The identification of the type of speech frame is divided into two parts: a) interframe fricative detection where fricatives in the speech frame are detected, and b) interframe formant detection where the formants in the speech frame are detected. The formant detection is supported by the scaling factor which is computed by the iterative autoscaling computation. Based on the output of the formant detection, the dynamic suppression filter and the noise suppression filter, the estimated clean speech spectrum is combined with a complex noisy spectrum.

During operation of this noise reduction, the speaker can be standing at any unknown distance from the microphones whose level needs to be estimated. Conventional noise reduction systems and methods estimate the scaling factor through a pre-tuned value, e.g., based on a system engineers' tuning. One drawback of this approach may be that the estimations and tunings cannot be easily ported to different devices and systems without extensive tests and tuning. To overcome this drawback, the scaling is automatically estimated in the systems and methods presented herein so that dynamic suppression can be applied without any substantial limitations. The systems and methods described herein automatically choose which acoustic scenario to operate in, and in-turn scale the incoming noisy input signal x(n) accordingly so that most devices in which such system and methods are implemented are enabled to allow human communication and speech recognition.

Figure 2:
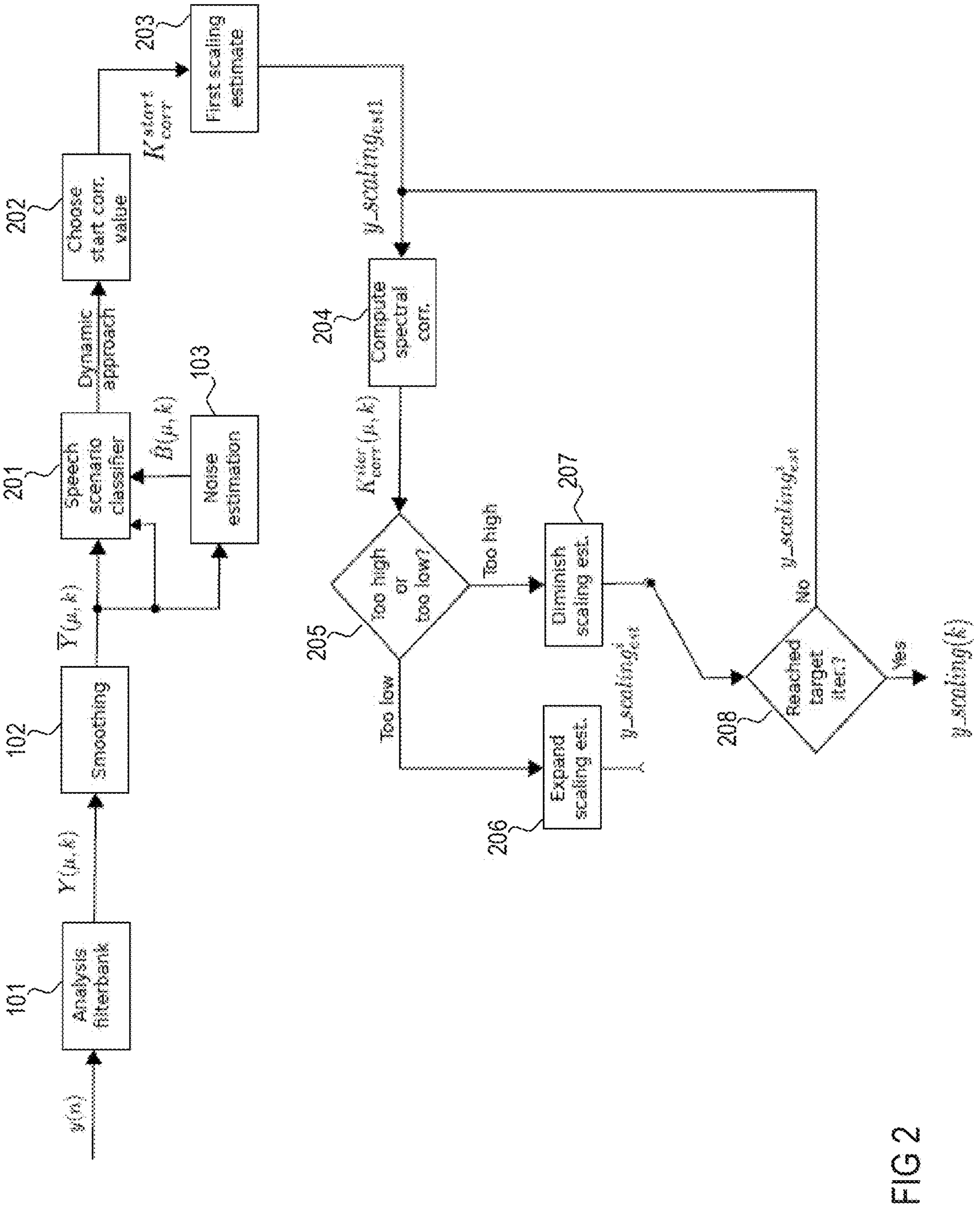
FIG. 2 is a schematic diagram illustrating an example autoscaling structure applicable in the structure shown in FIG. 1.

The autoscaling structure can be considered as an independent system or method which can plugged-in into any larger system or method as shown in FIG. 2, which is a schematic diagram illustrating the signal flow of an example independent autoscaling structure that is decoupled from the main noise reduction structure. In the following, the computation of the autoscaling is presented assuming the input of a noisy signal, i.e., it includes speech components and noise components. As in the system shown in and described in connection with FIG. 1, the noisy input signal y(n) is first transformed into the spectral domain through the analysis filter bank 101 to provide the output spectrum Y(μ,k). Accordingly, the input spectrum Y(μ,k) includes a speech spectrum that is the spectrum of the speech components and a noise spectrum that is the spectrum of the noise components. A smoothing filter, e.g., the smoothing filter 102 or a separate smoothing filter, which is operatively coupled to the analysis filter bank 101, smooths the magnitudes of the input spectrum Y(μ,k) to provide the smoothed-magnitude input spectrum $\bar{Y}(\mu, k)$. From the smoothed magnitude spectrum $\bar{Y}(\mu, k)$, the noise estimator 103 estimates the background noise spectrum B (μ,k) which is provided together with the smoothed magnitude spectrum $\bar{Y}(\mu, k)$ to control a speech scenario classification 201 that processes, as an input, the magnitude spectrum $\bar{Y}(\mu, k)$. If a dynamic approach scenario is identified by the speech scenario classification 201, a start correction value identification 202 takes place which provides start correlation values $K_{corr}^{start}$. From the start correlation values $K_{corr}^{start}$, a first scaling estimation 203 provides an initial estimate of the scaling factor $y\_scaling_{est1}$.

In a spectral correlator 204, further correlation values $K_{corr}^{iter}(\mu, k)$ are computed from the initial estimate of the scaling factor $y\_scaling_{est1}$. In a subsequent decision 205, the further correlation values $K_{corr}^{iter}(\mu, k)$ are evaluated whether they are too high or too low. If they are too low, an ith scaling factor $y\_scaling_{est}^{i}$ is output upon expanding the scaling factor estimate 206 and the ith scaling factor $y\_scaling_{est}^{i}$ forms basis for a new iteration. However, if the further correlation values $K_{corr}^{iter}(\mu, k)$ are too high, and upon diminishing the scaling factor estimate 207, a decision 208 is made whether the target iteration has been reached or not. If it has been reached, a scaling factor y_scaling(k) is output. If it has not been reached, the ith scaling factor $y\_scaling_{est}^{i}$ forms basis for a new iteration.

Different kinds of scenarios can exist for a given acoustic environment. In one scenario, the application of a dynamic suppression enhances the noisy signal. To this point, the signal-to-noise ratio of the targeted speaker plays a vital role. Hence, a given speech scenario is classified into either of the two scenarios: a classical approach scenario, and a dynamic approach scenario. The classical approach scenario is chosen in extremely low signal-to-noise ratio scenarios in which the application of the dynamic approach would deteriorate the speech quality rather than enhance it. This approach is not discussed further here. The dynamic approach scenario is chosen for all other scenarios, where the suppression would result in an enhanced speech quality and, thus, better subjective experience for the listener. To arrive at the decision of classical or dynamic, two measures are computed and considered: an instantaneous signal-to-noise ratio, and a long-term signal-to-noise ratio. Before computing the signal-to-noise ratio, it is first determined if the current frame is a speech frame or not. This can be made with a simple voice activity detector based on a threshold comparison given by:

$$Y_{inst}(k) = \begin{cases} k_\mu = 1, \text{ if } \bar{Y}(\mu, k) > \hat{B}(\mu, k) \cdot T_{lev-SNR} \\ k_\mu = 0, \text{ else} \end{cases} \tag{26}$$

$$k_{sum}(k) = \sum_{\mu=0}^{N_{Sbb}} k_\mu. \tag{27}$$

A simple voice activity detector would suffice here since the goal is to estimate the scaling and the estimate has to be based on a frame which has a high probability of being speech. This would ensure that the scaling estimate is of good quality. Once a signal $k_{sum}(k)$ meets a threshold condition $K_{thr-sum}$, resulting in a voice activity detector output Vad, $$Vad = \begin{cases} \text{Speech frame, if } k_{sum}(k) > K_{thr-sum} \\ \text{Non-speech frame, else} \end{cases}, \tag{28}$$

the instantaneous and the long-term signal-to-noise ratios can be computed. The instantaneous signal-to-noise ratio $\xi_{inst}(k)$ is computed by, $$\xi_{inst}(k) = \frac{\sum_{\mu=0}^{N_{Sbb}} \bar{Y}(\mu, k)}{\sum_{\mu=0}^{N_{Sbb}} \hat{B}(\mu, k)}. \tag{29}$$

The long-term signal-to-noise ratio is computed based on the instantaneous signal-to-noise ratio $\xi_{inst}(k)$ through a time-window averaging approach given by $$\xi_{inst}(k) = \frac{\sum_{i=0}^{L} \xi_{inst}(k-i)}{L}, \tag{30}$$

wherein $\xi_{lt}(k)$ is the long-term signal-to-noise ratio and L is the length of the time-window for averaging. The decision about the speech scenario SpSc is made by comparing the instantaneous and the long-term signal-to-noise ratios with respective thresholds given by $$SpSc = \begin{cases} \text{Dynamic approach, if } \xi_{inst}(k) > \xi_{thr-inst} \text{ and } \xi_{inst}(k) > \xi_{thr-lt} \\ \text{Classical approach, else} \end{cases}, \tag{31}$$

The following considerations are based on the assumption that the given scenario is a dynamic approach scenario. Given a known scaling, the (scaled) spectral correlation factor $K_{corr}(k)$ is computed by $$K_{corr}(k) = \frac{\sum_0^{N_{Sbb}} \text{y\_scaling} \cdot \overline{Y}(\mu, k) \cdot \overline{Y}(\mu, k)}{N_{Sbb}}. \quad (32)$$

Here it is desired to estimate the scaling given the fact that it is a speech frame. The scaling factor y_scaling(k) can be computed by rearranging Equation (32), $$\text{y\_scaling} = \frac{K_{corr}(k) \cdot N_{Sbb}}{\sum_0^{N_{Sbb}} \overline{Y}(\mu, k) \cdot \overline{Y}(\mu, k)}. \quad (33)$$

However, the spectral correlation factor $K_{corr}$ is also unknown. Therefore, the approach is to start with an assumed correlation value. This value can be any appropriate value. So, the spectral correlation factor $K_{corr}$ is set to be a positive integer factor $K_{factor}$ of the later used threshold $K_{thr}$, through which the start correlation value $K_{corr}^{start}$ is computed, $$K_{corr}^{start} = K_{thr} \cdot K_{factor}, \quad (34)$$

and the initial estimate of the scaling $\text{y\_scaling}_{est1}$ can be computed according to $$\text{y\_scaling}_{est1} = \frac{K_{corr}^{start} \cdot N_{Sbb}}{\sum_0^{N_{Sbb}} \overline{Y}(\mu, k) \cdot \overline{Y}(\mu, k)}. \quad (35)$$

Now a basis is established for an iterative search for the "optimal" scaling. The search is performed, for example, according to the following steps:

1. Compute the spectral correlation $K_{corr}^{i}$ based on the initial estimate of the scaling factor $\text{y\_scaling}_{est1}$ according to $$K_{corr}^{i} = \frac{\sum_0^{N_{Sbb}} \text{y\_scaling}_{est1} \cdot \overline{Y}(\mu, k) \cdot \overline{Y}(\mu, k)}{N_{Sbb}}, \quad (36)$$

wherein for $i = 1$, $\text{y\_scaling}_{est}^{i} = \text{y\_scaling}_{est1}$.

2. The spectral correlation value $K_{corr}^{i}$ is compared to the threshold $K_{thr}$ to evaluate if the estimated scaling is too high or too low.
3. If the value is too high, a simple diminishing rule is applied to re-estimate a new scaling factor $$\text{y\_scaling}_{est}^{i+1} = \frac{\text{y\_scaling}_{est1}^{i}}{2}. \quad (37)$$

4. If the value is too low, a simple expanding rule is applied to re-estimate a new scaling factor $$\text{y\_scaling}_{est}^{i+1} = \text{y\_scaling}_{est}^{i} + \frac{\text{y\_scaling}_{est1}}{2}. \quad (38)$$

5. Repeat steps 1 to 4 until iteration i reaches the target iteration $N_{iter}$.
6. Upon reaching the target iteration $N_{iter}$, the search algorithm is stopped and the current frame scaling factor is set to the value of last computed value $$\text{y\_scaling}(k) = \text{y\_scaling}_{est}^{N_{iter}}. \quad (39)$$

The computed scaling value may be sub-optimal or pseudo-optimal since the precision of the estimate depends on the number of iterations in the search algorithm.

Accordingly, the method includes detecting a frame which is a speech frame with high probability, and, based on this frame, computing the instantaneous and long-term SNR. The method allows choosing automatically which acoustic scenario to operate in and scaling the incoming noisy signal accordingly.

Figure 3:
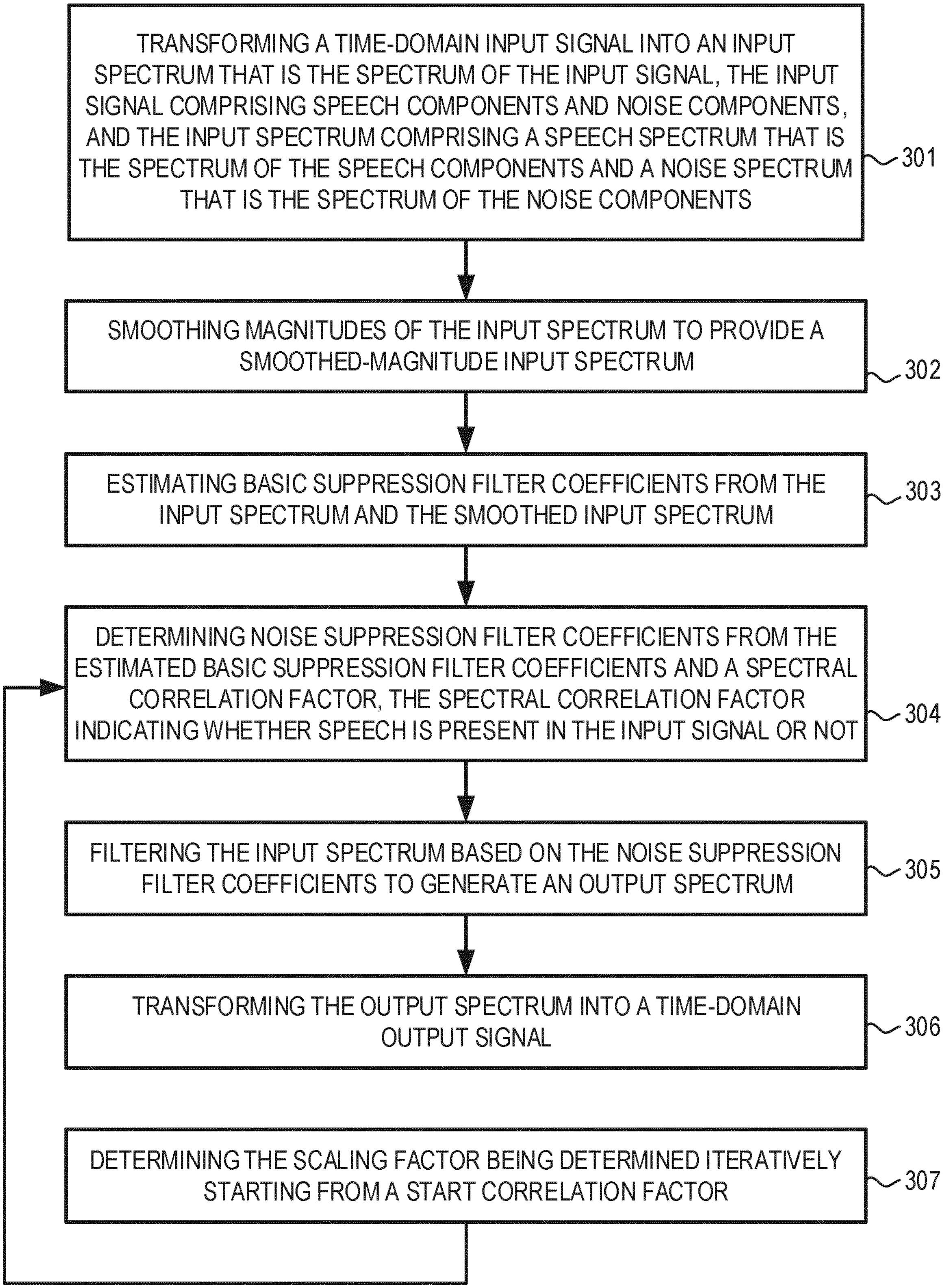
FIG. 3 is a flow chart illustrating an example method for reducing noise using autoscaling.

Referring to FIG. 3, an example noise suppression method includes transforming a time-domain input signal into an input spectrum that is the spectrum of the input signal, the input signal comprising speech components and noise components, and the input spectrum comprising a speech spectrum that is the spectrum of the speech components and a noise spectrum that is the spectrum of the noise components (procedure 301), smoothing magnitudes of the input spectrum to provide a smoothed-magnitude input spectrum (procedure 302), and estimating basic suppression filter coefficients from the input spectrum and the smoothed input spectrum (procedure 303). The method further includes determining noise suppression filter coefficients from the estimated basic suppression filter coefficients and a spectral correlation factor, the spectral correlation factor indicating whether speech is present in the input signal or not (procedure 304), filtering the input spectrum based on the noise suppression filter coefficients to generate an output spectrum (procedure 305), and transforming the output spectrum into a time-domain output signal (procedure 306). The spectral correlation factor is determined from a scaling factor and the smoothed input spectrum, the scaling factor being determined iteratively starting from a start correlation factor (procedure 307).

Figure 4:
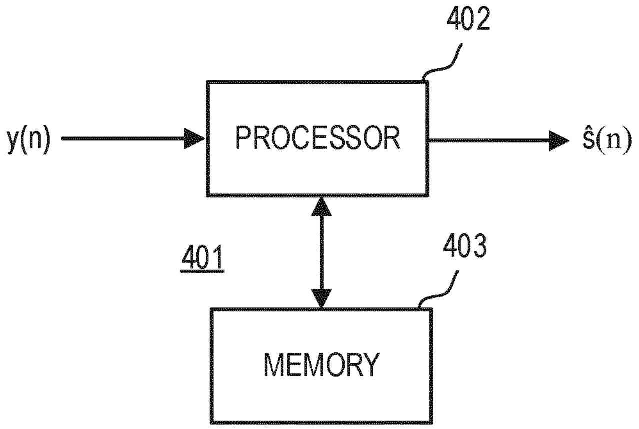
FIG. 4 is a schematic diagram illustrating a computer system configured to execute the method shown in FIG. 3.

The method may be implemented in dedicated logic or, as shown in FIG. 4, with a computer 401 that includes a processor 402 operatively coupled to a computer-readable medium such as a semiconductor memory 403. The memory stores instructions of computer program to be executed by the processor 402 and the computer 401 receives the input signal y(n) and outputs the speech signal ŝ(n). The instructions, when the program is executed by a computer, cause the computer 401 to carry out the method outlined above in connection with FIG. 3.

The method described above may be encoded in a computer-readable medium such as a CD ROM, disk, flash memory, RAM or ROM, an electromagnetic signal, or other machine-readable medium as instructions for execution by a processor. Alternatively or additionally, any type of logic may be utilized and may be implemented as analog or digital logic using hardware, such as one or more integrated circuits (including amplifiers, adders, delays, and filters), or one or more processors executing amplification, adding, delaying, and filtering instructions; or in software in an application programming interface (API) or in a Dynamic Link Library (DLL), functions available in a shared memory or defined as local or remote procedure calls; or as a combination of hardware and software.

The method may be implemented by software and/or firmware stored on or in a computer-readable medium, machine-readable medium, propagated-signal medium, and/ or signal-bearing medium. The media may comprise any device that contains, stores, communicates, propagates, or transports executable instructions for use by or in connection with an instruction executable system, apparatus, or device. The machine-readable medium may selectively be, but is not limited to, an electronic, magnetic, optical, electromagnetic, or infrared signal or a semiconductor system, apparatus, device, or propagation medium. A non-exhaustive list of examples of a machine-readable medium includes: a magnetic or optical disk, a volatile memory such as a Random Access Memory "RAM," a Read-Only Memory "ROM," an Erasable Programmable Read-Only Memory (i.e., EPROM) or Flash memory, or an optical fiber. A machine-readable medium may also include a tangible medium upon which executable instructions are printed, as the logic may be electronically stored as an image or in another format (e.g., through an optical scan), then compiled, and/or interpreted or otherwise processed. The processed medium may then be stored in a computer and/or machine memory.

The systems may include additional or different logic and may be implemented in many different ways. A controller may be implemented as a microprocessor, microcontroller, application specific integrated circuit (ASIC), discrete logic, or a combination of other types of circuits or logic. Similarly, memories may be DRAM, SRAM, Flash, or other types of memory. Parameters (e.g., conditions and thresholds) and other data structures may be separately stored and managed, may be incorporated into a single memory or database, or may be logically and physically organized in many different ways. Programs and instruction sets may be parts of a single program, separate programs, or distributed across several memories and processors.

The description of embodiments has been presented for purposes of illustration and description. Suitable modifications and variations to the embodiments may be performed in light of the above description or may be acquired from practicing the methods. For example, unless otherwise noted, one or more of the described methods may be performed by a suitable device and/or combination of devices. The described methods and associated actions may also be performed in various orders in addition to the order described in this application, in parallel, and/or simultaneously. The described systems are exemplary in nature, and may include additional elements and/or omit elements.

As used in this application, an element or step recited in the singular and proceeded with the word "a" or "an" should be understood as not excluding plural of said elements or steps, unless such exclusion is stated. Furthermore, references to "one embodiment" or "one example" of the present disclosure are not intended to be interpreted as excluding the existence of additional embodiments that also incorporate the recited features. The terms "first," "second," and "third," etc. are used merely as labels, and are not intended to impose numerical requirements or a particular positional order on their objects.

While various embodiments of the invention have been described, it will be apparent to those of ordinary skilled in the art that many more embodiments and implementations are possible within the scope of the invention. In particular, the skilled person will recognize the interchangeability of various features from different embodiments. Although these techniques and systems have been disclosed in the context of certain embodiments and examples, it will be understood that these techniques and systems may be extended beyond the specifically disclosed embodiments to other embodiments and/or uses and obvious modifications thereof.

The invention claimed is:

1. A noise suppression method comprising:

transforming a time-domain input signal into an input spectrum that is the spectrum of the input signal, the input signal comprising speech components and noise components, and the input spectrum comprising a speech spectrum that is the spectrum of the speech components and a noise spectrum that is the spectrum of the noise components;

smoothing magnitudes of the input spectrum to provide a smoothed-magnitude input spectrum;

estimating basic suppression filter coefficients from the input spectrum and the smoothed-magnitude input spectrum;

determining noise suppression filter coefficients from the estimated basic suppression filter coefficients and a spectral correlation factor, the spectral correlation factor indicating whether speech is present in the input signal or not;

filtering the input spectrum based on the noise suppression filter coefficients to generate an output spectrum; and transforming the output spectrum into a time-domain output signal; wherein the spectral correlation factor is determined from a scaling factor and the smoothed-magnitude input spectrum, the scaling factor being determined iteratively starting from a start correlation factor, wherein determining the start correlation factor is dependent on a speech scenario and comprises:

classifying the speech scenario based on the smoothed-magnitude input spectrum and an estimate of the noise component included in the input signal, and determining a start correlation factor in response to a dynamic approach scenario being identified by the speech scenario classification.

2. The method of claim 1, wherein the scaling factor is derived by an iterative optimum search from the input spectrum or the smoothed-magnitude input spectrum, the iterative optimum search including:

determining a further spectral correlation factor based on an initial estimate of the scaling factor;

comparing the further spectral correlation factor to a further threshold to evaluate if the estimate of the scaling factor is too high or too low;

if the estimate is too high, applying a diminishing procedure to provide a re-estimated scaling factor;

if the estimate is too low, applying a simple expanding procedure to provide a re-estimated scaling factor;

repeating the previous steps until an iteration count reaches a target iteration count; and upon reaching the target iteration count, the re-estimated scaling factor is output as the scaling factor.

3. The method of claim 1, wherein determining the spectral correlation factor includes performing formant detection based on the scaling factor and the smoothed-magnitude input spectrum to provide the spectral correlation factor.

4. The method of claim 3, wherein determining the spectral correlation factor further includes performing fricative detection based on the scaling factor and the smoothed-magnitude input spectrum to control the formant detection.

5. The method of claim 1, wherein the noise suppression filter coefficients are further determined from dynamic suppression filter coefficients, the dynamic suppression filter coefficients representative of the suppression to be applied to dynamic noise components of the input signal and dependent on a dynamicity of the noise components of the input signal.

6. The method of claim 5, wherein the dynamic suppression filter coefficients are derived by comparing the input spectrum and the smoothed-magnitude input spectrum.

7. The method of claim 1 further comprising determining an instantaneous signal-to-noise ratio and a long-term signal-to-noise ratio of a detected frame that is a speech frame.

8. The method of claim 1, wherein estimating basic suppression filter coefficients comprises:

estimating the noise included in the input spectrum from the input spectrum and the smoothed-magnitude input spectrum to provide an estimated background noise spectrum; and estimating Wiener filter coefficients based on the estimated background noise spectrum and the input spectrum, the Wiener filter coefficients serve as basic suppression filter coefficients.

9. A noise suppression system comprising a processor and a memory, the memory storing instructions of a program and the processor configured to execute the instructions of the program, carrying out the method of claim 1.

10. A computer program product comprising instructions and being stored on a non-transitory memory, which, when the program is executed by a computer that is operably coupled to the memory, cause the computer to carry out the method of claim 1.

11. A noise suppression system comprising:

memory; and a processor being operably coupled to the memory and being programmed to:

transform a time-domain input signal into an input spectrum that is a spectrum of the input signal, the input signal comprising speech components and noise components, and the input spectrum comprising a speech spectrum that is the spectrum of the speech components and a noise spectrum that is the spectrum of the noise components;

smooth magnitudes of the input spectrum to provide a smoothed-magnitude input spectrum;

estimate basic suppression filter coefficients from the input spectrum and the smoothed-magnitude input spectrum;

determine noise suppression filter coefficients from the estimated basic suppression filter coefficients and a spectral correlation factor, the spectral correlation factor indicating whether speech is present in the input signal or not;

filter the input spectrum based on the noise suppression filter coefficients to generate an output spectrum; and transform the output spectrum into a time-domain output signal; wherein the spectral correlation factor is determined from a scaling factor and the smoothed-magnitude input spectrum, the scaling factor being determined iteratively starting from a start correlation factor, wherein to determine the start correlation factor is dependent on a speech scenario and comprises to:

classify the speech scenario based on the smoothed-magnitude input spectrum and an estimate of the noise component included in the input signal, and determine a start correlation factor in response to a dynamic approach scenario being identified by the speech scenario classification.

12. The system of claim 11, wherein the processor is further programmed to perform formant detection based on the scaling factor and the smoothed-magnitude input spectrum to provide the spectral correlation factor.

13. The system of claim 12, wherein the processor is further programmed to perform fricative detection based on the scaling factor and the smoothed-magnitude input spectrum to control the formant detection.

14. The system of claim 11, wherein the noise suppression filter coefficients are further determined from dynamic suppression filter coefficients, the dynamic suppression filter coefficients representative of the suppression to be applied to dynamic noise components of the input signal and dependent on a dynamicity of the noise components of the input signal.

15. The system of claim 14, wherein the processor is further programmed to derive the dynamic suppression filter coefficients by comparing the input spectrum and the smoothed-magnitude input spectrum.

16. A method for performing noise suppression comprising:

transforming a time-domain input signal into an input spectrum, the time-domain input signal comprising speech components and noise components, and the input spectrum comprising a speech spectrum that is the spectrum of the speech components and a noise spectrum that is the spectrum of the noise components;

smoothing magnitudes of the input spectrum to provide a smoothed-magnitude input spectrum;

estimating basic suppression filter coefficients from the input spectrum and the smoothed-magnitude input spectrum;

determining noise suppression filter coefficients from the estimated basic suppression filter coefficients and a spectral correlation factor, the spectral correlation factor indicating whether speech is present in the input signal or not;

filtering the input spectrum based on the noise suppression filter coefficients to generate an output spectrum; and transforming the output spectrum into a time-domain output signal; wherein the spectral correlation factor is determined from a scaling factor and the smoothed-magnitude input spectrum, and wherein determining the start correlation factor is dependent on a speech scenario and comprises:

classifying the speech scenario based on the smoothed-magnitude input spectrum and an estimate of the noise component included in the input signal, and determining a start correlation factor in response to a dynamic approach scenario being identified by the speech scenario classification.

17. The method of claim 16, wherein the scaling factor is determined by iteratively starting from a start correlation factor.

18. The method of claim 16, wherein determining the spectral correlation factor includes performing formant detection based on the scaling factor and the smoothed-magnitude input spectrum to provide the spectral correlation factor.

19. The method of claim 18, wherein determining the spectral correlation factor further includes performing fricative detection based on the scaling factor and the smoothed-magnitude input spectrum to control the formant detection.

* * * * *